United States Patent
Seok et al.

(10) Patent No.: US 8,891,653 B2
(45) Date of Patent: Nov. 18, 2014

(54) MU-MIMO TRANSMISSION METHOD IN WIRELESS LAN SYSTEM

(75) Inventors: Yong Ho Seok, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/509,277

(22) PCT Filed: Nov. 12, 2010

(86) PCT No.: PCT/KR2010/007975
§ 371 (c)(1),
(2), (4) Date: May 10, 2012

(87) PCT Pub. No.: WO2011/059248
PCT Pub. Date: May 19, 2011

(65) Prior Publication Data
US 2012/0230443 A1 Sep. 13, 2012

Related U.S. Application Data

(60) Provisional application No. 61/260,407, filed on Nov. 12, 2009.

(51) Int. Cl.
*H04B 7/02* (2006.01)
*H04L 1/02* (2006.01)
*H04B 7/04* (2006.01)
*H04B 7/06* (2006.01)

(52) U.S. Cl.
CPC ............ *H04B 7/0632* (2013.01); *H04B 7/0663* (2013.01); *H04B 7/0452* (2013.01); *H04B 7/0617* (2013.01)
USPC .......................................... 375/267; 455/132

(58) Field of Classification Search
CPC ... H04B 7/0617; H04B 7/0417; H04B 7/0413
USPC ........................................................ 375/267
See application file for complete search history.

(56) References Cited

U.S. PATENT DOCUMENTS

2007/0298742 A1    12/2007 Ketchum et al.
(Continued)

OTHER PUBLICATIONS

C.B. Chae et al., "Coordinated Beamforming for Multiuser MIMO Systems with Limited Feedforward", Fortieth Asilomar Conference on Signals, Systems and Computers, Nov. 2006.

(Continued)

*Primary Examiner* — Tanmay Shah
(74) *Attorney, Agent, or Firm* — Lee, Hong, Degerman, Kang & Waimey

(57) ABSTRACT

A Multi-User-Multiple Input Multiple Output (MU-MIMO) transmission method performed by an AP in a Wireless Local Area Network (WLAN) system is provided. The method includes transmitting an MU-MIMO initiation message to a destination STA which is a target of a MU-MIMO transmission, the MU-MIMO initiation message informing that MU-MIMO transmission will be initiated, receiving a sounding frame transmitted by the destination STA as a response to the MU-MIMO initiation message and performing MU-MIMO transmission on data by beamforming based on channel information obtained from the sounding frame. The sounding frame includes precoded and virtualized channel information $H_{virtual}$ between the AP and the STA. A dimension of the $H_{virtual}$ is lower than a dimension of channel information H between the AP and the STA.

8 Claims, 13 Drawing Sheets

(56) References Cited

U.S. PATENT DOCUMENTS

2008/0014870 A1    1/2008   Kim
2009/0252250 A1   10/2009   Heath, Jr. et al.
2010/0067605 A1*   3/2010   Jongren ........................ 375/267
2012/0176982 A1*   7/2012   Zirwas et al. ................. 370/329

OTHER PUBLICATIONS

Y. Tsuchiya et al., "Scheduling Algorithm with Power Allocation for Random Unitary Beamforming", IEEE 65th Vehicular Technology Conference, Apr. 2007.

* cited by examiner

MU-MIMO TRANSMISSION METHOD IN WIRELESS LAN SYSTEM

CROSS-REFERENCE TO RELATED APPLICATIONS

This application is the National Stage filing under 35 U.S.C. 371 of International Application No. PCT/KR2010/007975, filed on Nov. 12, 2010, which claims the benefit of U.S. Provisional Application Ser. No. 61/260,407, filed on Nov. 12, 2009, the contents of which are all incorporated by reference herein in their entirety.

TECHNICAL FIELD

The present invention relates to wireless communication and, more specifically, to a Multi-User Multiple Input Multiple Output (MU-MIMO) transmission method in a Wireless Local Area Network (WLAN) system.

BACKGROUND ART

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802, that is, the standardization organization of WLAN technology was established on February, 1980.

Initial WLAN technology supported a speed of 1 to 2 Mbps through frequency hopping, band spreading, and infrared communication by using a frequency of 2.4 GHz according to IEEE 802.11, but recently can support a maximum speed of 54 Mbps by using Orthogonal Frequency Division Multiplex (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or being developed.

Furthermore, in order to overcome limitations to the communication speed that was considered as being weakness in the WLAN, there is IEEE 802.11n as a relatively recently established technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. Furthermore, this standard may use not only a coding scheme for transmitting several redundant copies in order to increase data reliability, but also Orthogonal Frequency Division Multiplex (OFDM) in order to increase the speed.

As the WLAN is actively propagated and applications employing the WLAN are diversified, a need for a new WLAN system for supporting a throughput higher than the data processing speed supported by IEEE 802.11n is recently being on the rise. A Very High Throughput (VHT) WLAN system is one of IEEE 802.11 WLAN systems which are recently newly proposed in order to support a data processing speed of 1 Gbps or higher.

In IEEE 802.11 TGac that performs the standardization of the VHT WLAN system, active research is being carried out on a scheme using 8×8 MIMO and a channel bandwidth of 80 MHz or higher in order to provide the throughput of 1 Gbps or higher.

An object of the VHT WLAN system is to support an aggregated throughput of 1 Gbps or higher and to obtain a throughput of at least 500 Mbps or higher in one-to-one communication between terminals. To this end, it is necessary for several STAs to efficiently use a channel at the same. In order for several STAs to efficiently use a channel at the same time, an AP uses a Space Division Multiple Access (SDMA) scheme, such as Multi-user MIMO. That is, several STAs are permitted to perform transmission and reception to and from an AP at the same time.

If several STAs transmit and receive frames to and from an AP at the same time, an interference problem may occur. For example, in case of MU-MIMO downlink (DL) transmission, if a second STA is receiving a frame from an AP while a first STA is receiving a frame from the AP, the transmission of the frame from the AP to the second STA may function as interference with the first STA. As technology for solving the interference problem, beamforming transmission utilizing smart antenna technology may be taken into consideration. In a method of reducing interference in MU-MIMO transmission using beamforming, channel estimation and link adaptation procedures, the transmission of relevant control information, and a frame transmission method through the control information between STAs, that is, the targets of MU-MIMO transmission to an AP need to be taken into consideration.

DISCLOSURE

Technical Problem

An object of the present invention is to provide an MU-MIMO transmission method and a wireless apparatus supporting the same, which reduce interference which may occur when frames are transmitted to a plurality of STAs at the same time in a WLAN system supporting MU-MIMO.

Technical Solution

In an aspect, a Multi-User-Multiple Input Multiple Output (MU-MIMO) transmission method performed by an AP in a Wireless Local Area Network (WLAN) system is provided. The method includes: transmitting an MU-MIMO initiation message to a destination STA which is a target of a MU-MIMO transmission, the MU-MIMO initiation message informing that MU-MIMO transmission will be initiated, receiving a sounding frame transmitted by the destination STA as a response to the MU-MIMO initiation message and performing MU-MIMO transmission on data by beamforming based on channel information obtained from the sounding frame. The sounding frame comprises precoded and virtualized channel information $H_{virtual}$ between the AP and the STA. A dimension of the $H_{virtual}$ is lower than a dimension of channel information H between the AP and the STA.

The MU-MIMO initiation message may include dimension indication information, and the dimension of the $H_{virtual}$ may be determined based on the dimension indication information.

The obtaining the $H_{virtual}$ from the sounding frame may be obtained by performing channel estimation based on the sounding frame.

The obtaining the $H_{virtual}$ from the sounding frame may be obtained by receiving the channel coefficient of the quantized $H_{virtual}$ which is transmitted in the sounding frame.

The precoding applied to the sounding frame may be performed by applying an eigen matrix as a precoding matrix, the eigen matrix being obtained by performing Singular Value Decomposition (SVD) on the H.

The precoding applied to the sounding frame may be performed by applying a matrix as a precoding matrix, the matrix consisting of some or row vectors or $U^H$, the $U^H$ being obtained by SVD on the H.

The dimension indication information may include at least one among information indicating a difference between the dimension of the H and the dimension of the $H_{virtual}$, information indicating the dimension of the $H_{virtual}$, and information indicating the number of virtualized Rx antennas of the destination STA.

In another aspect of the present invention, a channel sounding method performed by a station (STA) in a Wireless Local Area Network (WLAN) system supporting Multi-User-Multiple Input Multiple Output (MU-MIMO) is provided. The method includes: receiving an MU-MIMO initiation message from an Access Point (AP), the MU-MIMO initiation message informing that MU-MIMO transmission will be initiated, and transmitting a sounding frame as a response to the MU-MIMO initiation message. The sounding frame provides $H_{virtual}$ to the AP, the $H_{virtual}$ being precoded and virtualized channel information between the AP and the STA. A dimension of the $H_{virtual}$ is lower than a dimension of channel information H between the AP and the STA.

The MU-MIMO initiation message may include dimension indication information, and the dimension of the $H_{virtual}$ may be determined based on the dimension indication information.

The precoding applied to the sounding frame may be performed by applying an eigen matrix as a precoding matrix, the eigen matrix being obtained by Singular Value Decomposition (SVD) on the H.

The dimension indication information may include at least one among information indicating a difference between the dimension of the H and the dimension of the $H_{virtual}$, information indicating the dimension of the $H_{virtual}$, and information indicating the number of virtualized Rx antennas of the destination STA.

In a still another aspect of the present invention, a station (STA) is provided. The STA includes a processor and a transceiver operably coupled to the processor and configured to transmit and receive frames. The processor is configured to: receive an MU-MIMO initiation message from an Access Point (AP), the MU-MIMO initiation message informing that MU-MIMO transmission will be initiated and transmit a sounding frame to the AP as response to the MU-MIMO initiation message, the sounding frame providing $H_{virtual}$ to the AP, the $H_{virtual}$ being precoded and virtualized channel information between the AP and the STA. A dimension of the $H_{virtual}$ is lower than a dimension of channel information H between the AP and the STA.

Advantageous Effects

The efficiency of MU-MIMO transmission can be improved by reducing interference which may occur when frames are transmitted to a plurality of STAs at the same time.

MODE FOR INVENTION

Embodiments of the present invention are described in detail below with reference to the accompanying drawings. The embodiment described later may be usefully applied in a Very High Throughput (VHT) WLAN system supporting Multi-User Multiple Input Multiple Output (MU-MIMO), and a VHT WLAN system is described as an example, but the technical spirit of the present invention is not limited thereto. For example, a frame transmission method proposed by the present invention may also be likewise applied to a case where the transmissions or receptions of frames interfere with each other because the transmissions or receptions can be performed at the same time.

Figure 1:
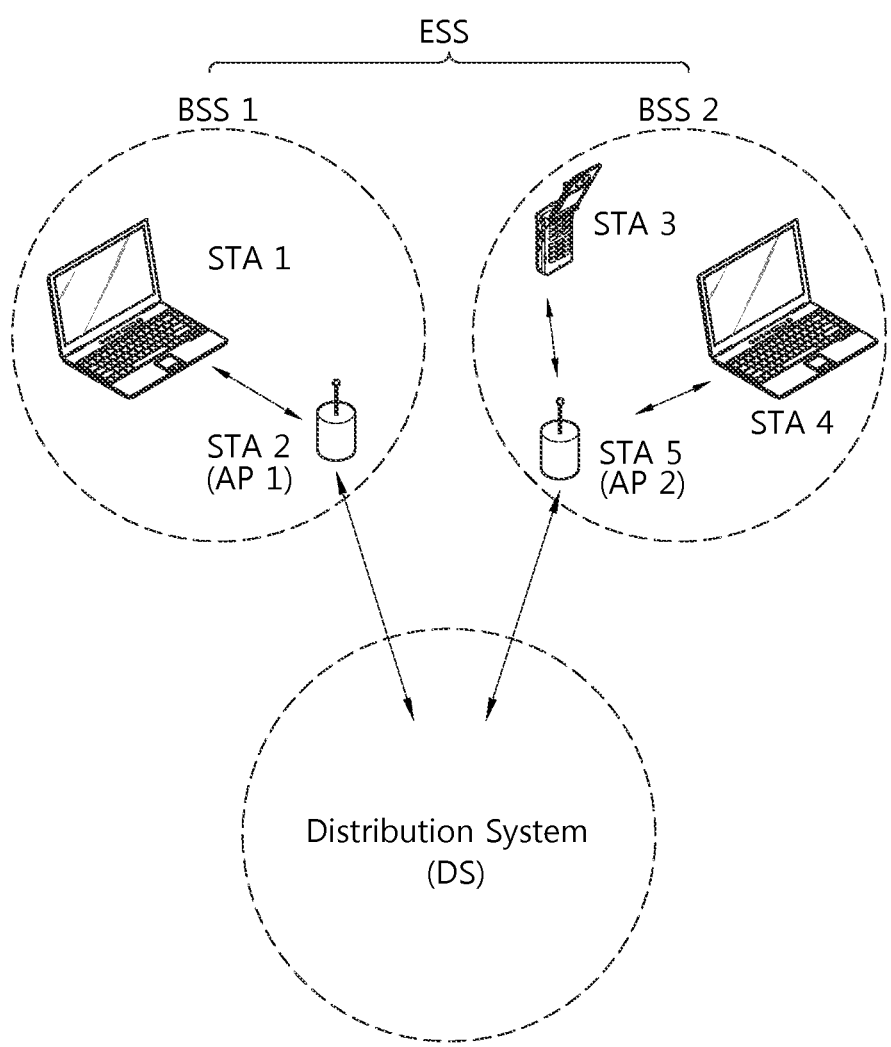
FIG. 1 simply shows a construction for an example of a WLAN system to which embodiments of the present invention may be applied.

FIG. 1 simply shows a construction for an example of a WLAN system to which embodiments of the present invention may be applied.

Referring to FIG. 1, the WLAN system includes one or more Basic Service Sets (BSSs). The BSS is a set of STAs that are successfully synchronized with one another for communication, but is not a concept indicating a specific area. The BSS may be classified into an infrastructure BSS and an independent BSS (IBSS). The infrastructure BSS is shown in FIG. 1. The infrastructure BSSs BSS1 and BSS2 include one or more STAs STA1, STA3, and STA4, a plurality of APs AP1 and AP2, that is, an STA providing distribution service, and a Distribution System (DS) coupling the plurality of APs AP1 and AP2. In contrast, in the IBSS, all STAs consist of mobile STAs because an AP is not included, and all the STAs form a self-contained network because access to a DS is not permitted.

An STA is a functional entity, including Medium Access Control (MAC) and a physical layer interface for a wireless medium according to the regulations of the IEEE 802.11 standard. In a broad sense, an STA includes both an AP and a non-AP STA. Furthermore, an STA supporting ultra-high speed data processing of 1 GHz or higher and enabling MU-MIMO transmission/reception is called a VHT STA. In a VHT WLAN system to which the embodiments of the present invention may be applied, all STAs included in a BSS may be VHT STAs, or a VHT STA and a legacy STA (e.g., an STA according to IEEE 802.11 a/b/g/n std.) may coexist in the BSS.

Mobile terminals manipulated by users, from among STAs, include non-AP STAs STA1, STA3, STA4, STA6, STA7, and STA8. When a mobile terminal is simply called an STA, it also refers to a non-AP STA. A non-AP STA may also be called another terminology, such as a terminal, a Wireless Transmit/Receive Unit (WTRU), User Equipment (UE), a Mobile Station (MS), a Mobile Terminal (MT), or a Mobile Subscriber Unit (MSU). A non-AP STA, supporting MU-MIMO transmission to be described later and supporting ultra-high speed data processing of 1 GHz or higher, is called a non-AP VHT STA or simply a VHT STA.

The APs AP1 and AP2 are functional media providing access to the DS via a wireless medium for STAs associated therewith. In an infrastructure BSS including an AP, in principle, communication between non-AP STAs is performed via the AP, but if a direct link is set up, the non-AP STAs may directly communicate with each other. An AP may also be called a centralized controller, a Base Station (BS), a node-B, a Base Transceiver System (BTS), or a site controller in addition to a name, such as an access point. Furthermore, an AP supporting MU-MIMO transmission to be described later is called a VHT AP.

A plurality of infrastructure BSSs may be interconnected through a Distribution System (DS). The plurality of BSSs coupled through the DS is called an Extended Service Set (ESS). STAs included in the ESS may communicate with one another. A non-AP STA may move from one BSS to the other BSS within the same ESS while performing seamless communication.

The DS is a mechanism for enabling one AP to communicate with the other AP. According to this mechanism, an AP may transmit a frame for STAs associated with a BSS managed by the AP, transfer a frame if one STA has moved to another BSS, or transfer a frame to an external network, such as a wired network. The DS does not need to be necessarily a network, and it may have any form if the DS can provide specific distribution service defined in IEEE 802.11. For example, the DS may be a wireless network, such as a mesh network, or a physical structure for coupling APs.

In describing the present invention hereinafter, to transmit spatially multiplexed data to a plurality of STAs is called SDMA transmission. In order to permit a plurality of STAs to access a channel and perform SDMA transmission at the same time, the STAs may perform transmission at the same time through a plurality of spatial streams by using respective multiple antennas. MU-MIMO is a method in which a plurality of STAs including multiple antennas transmits and/or receives independent data streams at the same time. Downlink (DL) MU-MIMO means that one STA performs MU-MIMO transmission to a plurality of reception STAs. Here, the one transmission STA may be an AP, and the plurality of destination STAs may be non-AP STAs. Hereinafter, what a plurality of STAs is paired means that they are paired with destination STAs for MU-MIMO transmission. The paired STA refers to an STA paired as a target transmission STA for MU-MIMO.

In order for a frame to be transmitted through a plurality of spatial streams, a channel estimation procedure and a link adaptation procedure are necessary. Channel estimation may be performed through the transmission of a sounding frame and a channel estimation process using the sounding frame. A Modulation and Coding Scheme (MCS) to be used for each spatial stream may be determined through a link adaptation procedure. The link adaptation procedure may be performed in such a manner that an STA that wants to transmit a frame requests an MCS value to be used and, in response thereto, a reception STA responds to the MCS value.

Figure 2:
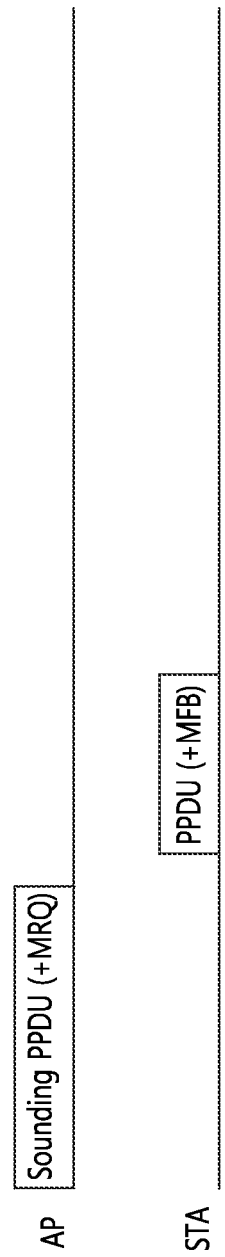
FIG. 2 shows an example of a channel link adaptation procedure.

FIG. 2 shows an example of a channel link adaptation procedure.

Referring to FIG. 2, an AP that wants to transmit a frame transmits an MCS Feedback Request (MRQ) to a reception STA in order to determined an MCS value suitable for a channel state. The reception STA estimates the MCS value suitable for the channel state in response to the MRQ and transmits the estimated MCS value to the AP as a response.

In a link adaptation procedure in IEEE 802.11n WLAN system (hereinafter referred to as an HT WLAN system) supporting Single User (SU) MIMO, an MCS feedback request STA (i.e., an MCS feedback requester) transmits an MRQ in order to receive an MCS feedback (MFB) from the MCS feedback request STA (i.e., an MCS feedback requester). In the HT WLAN system, the MRQ is transmitted through a link adaptation control subfield of a High Throughput Control (HTC) field. The HTC field is included in the MAC header of a Media Access Control (MAC) frame and transmitted in the HT WLAN system. The link adaptation control subfield may further include information indicating whether to request sounding frame transmission (training request, TRQ) for channel estimation, antenna selection information, an MCS feedback sequence indicator, and so on.

A reception terminal estimates an MCS suitable for a channel state by using a sounding PPDU and transmits the estimated result to an AP as a response. In the HT WLAN system, the MFB is transmitted through the link adaptation control subfield of the HTC field.

The above-described SU-MIMO transmission corresponds to a case where one source STA transmits a frame to one destination STA by using a plurality of spatial streams, and thus the transmission of the frame to other destination STAs has not been performed at the same time. In this aspect, an interference problem due to the transmission of a frame to other STAs in SU-MIMO transmission may not be taken into consideration. In contrast, if MU-MIMO transmission in which a frame is transmitted to a plurality of destination STAs by using a plurality of spatial streams is taken into consideration, there is a problem in that the transmission of a frame to any one destination STA may function as interference with another destination STA which receives the frame at the same time.

In the link adaptation procedure in the HT WLAN system, as can be seen from the example of FIG. 2, 1:1 transmission between one source STA and one destination STA is basically scheduled. Accordingly, in an environment, such as MU-MIMO, a problem may occur in which an interference problem that may occur in point-to-multi-point transmission is not taken into consideration.

Accordingly, if MU-MIMO transmission is sought to be supported, a channel estimation procedure and a link adaptation procedure in which a problem that the transmission of a frame to any one destination STA may function as interference with another destination STA is taken into consideration are necessary. In other words, it is necessary to minimize the influence of the transmission of a frame on another destination STA with consideration taken of that transmission to another destination STA is performed at the same time in the channel estimation procedure and the link adaptation procedure. It is necessary to obtain channel information through the channel estimation and link adaptation procedures into which the MU-MIMO transmission environment characteristics are incorporated and to determine an MCS based on the channel information.

Figure 3:
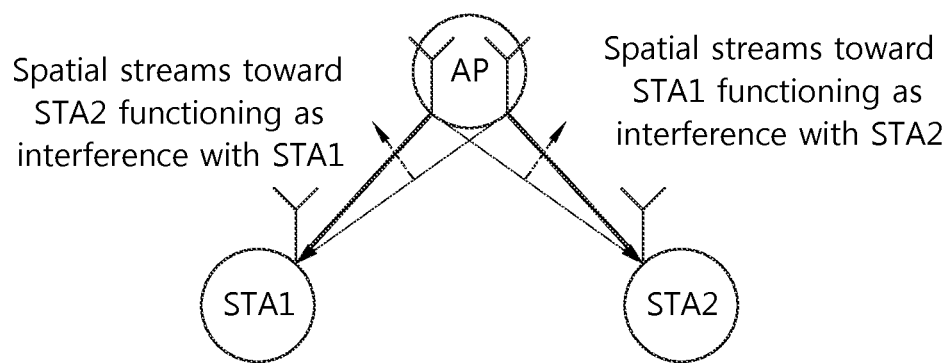
FIG. 3 schematically shows an interference problem that may occur in MU-MIMO transmission.

FIG. 3 schematically shows an interference problem that may occur in MU-MIMO transmission.

FIG. 3 illustrates a case where an AP performs MU-MIMO DL transmission to an STA1 and an STA2. It is assumed that the AP has two antennas and each of the STA1 and the STA2 has one antenna, but this is only illustrative, for convenience of description. In the embodiments of the present invention to be described hereinafter, the number of antennas of an AP and an STA is not limited thereto.

As illustrated in FIG. 3, when the AP performs DL transmission to the STA1 and the STA2 at the same time, spatial streams transmitted to the STA2 may function as interference with the STA1. Likewise, spatial streams transmitted to the STA1 may function as interference with the STA2.

In DL MU-MIMO transmission, an AP performs transmission to a plurality of STAs at the same time through several spatial streams. At this time, the spatial streams toward the different STAs may function as interference mutually. In order to reduce the interference, it is necessary to pair STAs having lower channel reciprocity and to perform transmission.

Although an AP selects STAs having low channel reciprocity and performs DL transmission, the DL transmission may still function as interference. It is impossible to pair only STAs having the channel reciprocity of a specific level or lower and to perform transmission, or the pairing of the destination STAs may not be preferred in terms of the entire throughput.

In order to solve the problem, when an STA estimates an MCS and transmit an MCS feedback to an AP, the AP needs to transmit an MRQ message to terminals on which DL MU MIMO transmission will be performed, in other words, STAs paired as destination STAs for MU-MIMO transmission at the same time in order to precisely estimate the MCS. Here, the MRQ message may be included in a sounding PPDU and transmitted. This is for performing MCS estimation more precisely by taking the influence of spatial streams toward another STA which may function as interference into consideration. As described above, an MCS value estimated through a link adaptation procedure in SU MIMO transmission, such as that shown in the example of FIG. 2, doe not properly take interference, generated by spatial streams toward another terminal in an MU MIMO environment, into consideration.

Figure 4:
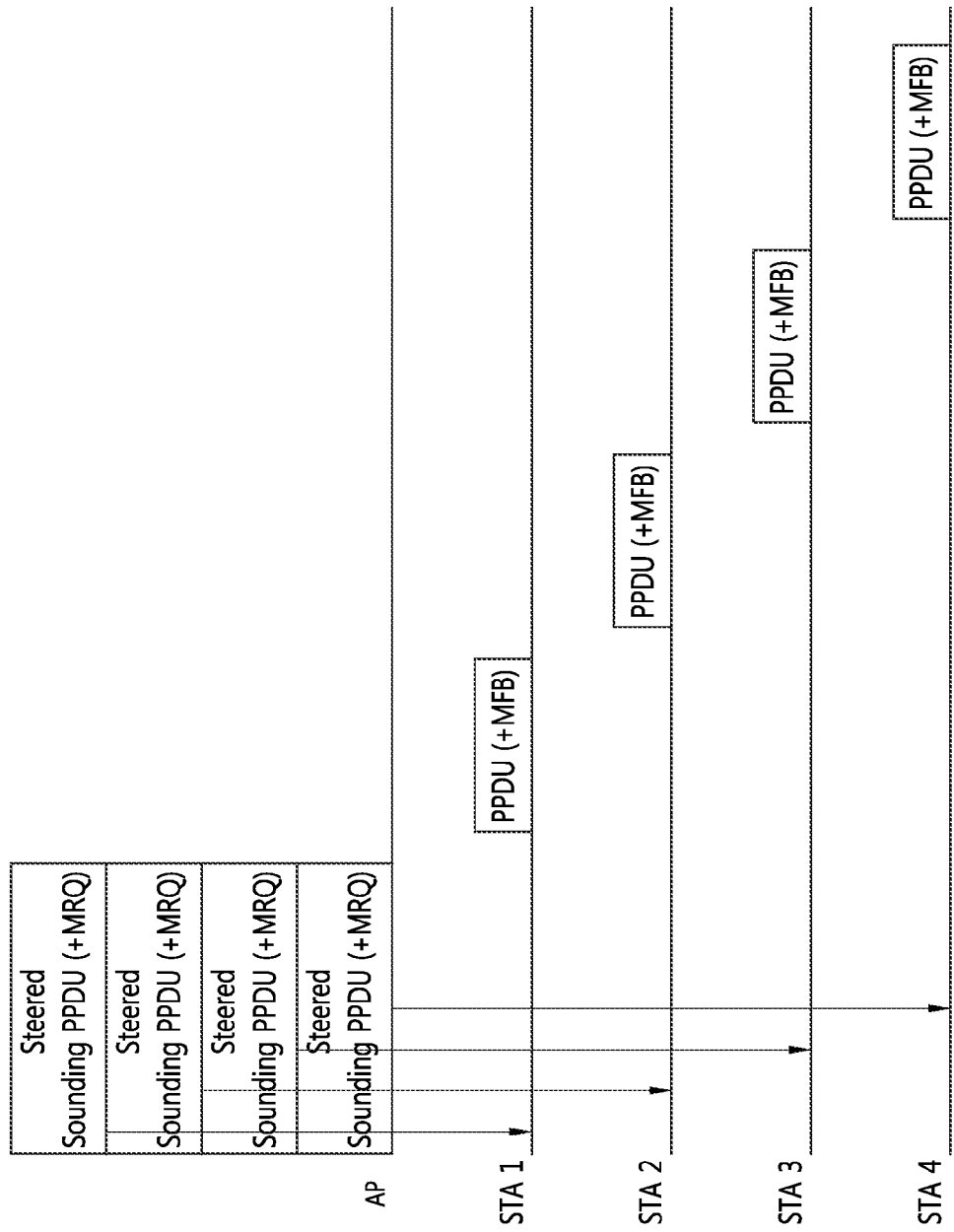
FIG. 4 shows an example of a link adaptation procedure which may be applied in MU MIMO.

FIG. 4 shows an example of a link adaptation procedure which may be applied in MU MIMO.

The example of FIG. 4 illustrates DL MU-MIMO transmission, but may also be applied to an example of uplink (UL) MU-MIMO transmission. In the example of FIG. 4, an AP wants to perform DL MU-MIMO transmission to an STA 1, an STA 2, an STA 3, and an STA 4. The AP transmits an MRQ message, requesting MCS feedback transmission, to the paired STAs the STA 1, the STA 2, the STA 3, and the STA 4 at the same time. The MRQ message is transmitted through a sounding PPDU. Here, the sounding PPDU including the MRQ message is transmitted as a sounding PPDU steered by a precoding vector so that the sounding PPDU can be subject to beamforming transmission toward each of the destination STAs. Each of the STAs estimates an MCS based on the received sounding PPDU. Since the AP has transmitted the steered sounding PPDU to the STA 1, the STA 2, the STA 3, and the STA 4 at the same time, each STA may incorporate interference that may occur owing to spatial streams transmitted to other STAs into the estimation of the MCS. In other words, since the steered sounding PPDU is transmitted to the STAs which estimates the MCSs, the STAs can estimate the MCSs on the basis of the same channel environment as that when subsequent MU-MIMO transmission is performed.

If the AP transmits the MRQ message, requesting MCS feedbacks, to several STAs at the same, MFB sequence indicator values of the MRQ transmitted at the same time may have the same value. In this case, an STA requesting an MCS feedback (i.e., an MCS feedback requester) can efficiently manage the MCS Feedback (MFB) reports of destination STAs for MU-MIMO transmission, and the waste of resources occurring when individual MFB sequence indicators are transmitted can be reduced. Likewise, when the STAs transmit the respective MFBs, the MFB sequence indicators have the same value. Accordingly, the MCS feedback report having the same MFB sequence indicator means an MCS value estimated by each of the STAs paired for MU-MIMO transmission. The MFB sequence indicator may be included in an MAC header and transmitted. In an HT WLAN system, the MFB sequence indicator is transmitted through a link adaptation control subfield, and it has a value from 0 to 7.

In order to avoid a collision between the MFBs when the STA 1, the STA 2, the STA 3, and the STA 4 transmit the MFBs, the MRQ message including the transmission order of the MFBs may be transmitted, and the STA 1, the STA 2, the STA 3, and the STA 4 may transmit the MFBs according to the transmission order.

If the AP wants the MFB to be transmitted after a specific delayed time, the AP may broadcast an MCS feedback request management action frame after the specific delayed time. The STAs which have received the MCS feedback request management action frame transmit the MFBs to the AP after the specific delayed time. The MCS feedback request management action frame may include information about the MFB transmission order of the STAs which transmit the MFBs.

Figure 5:
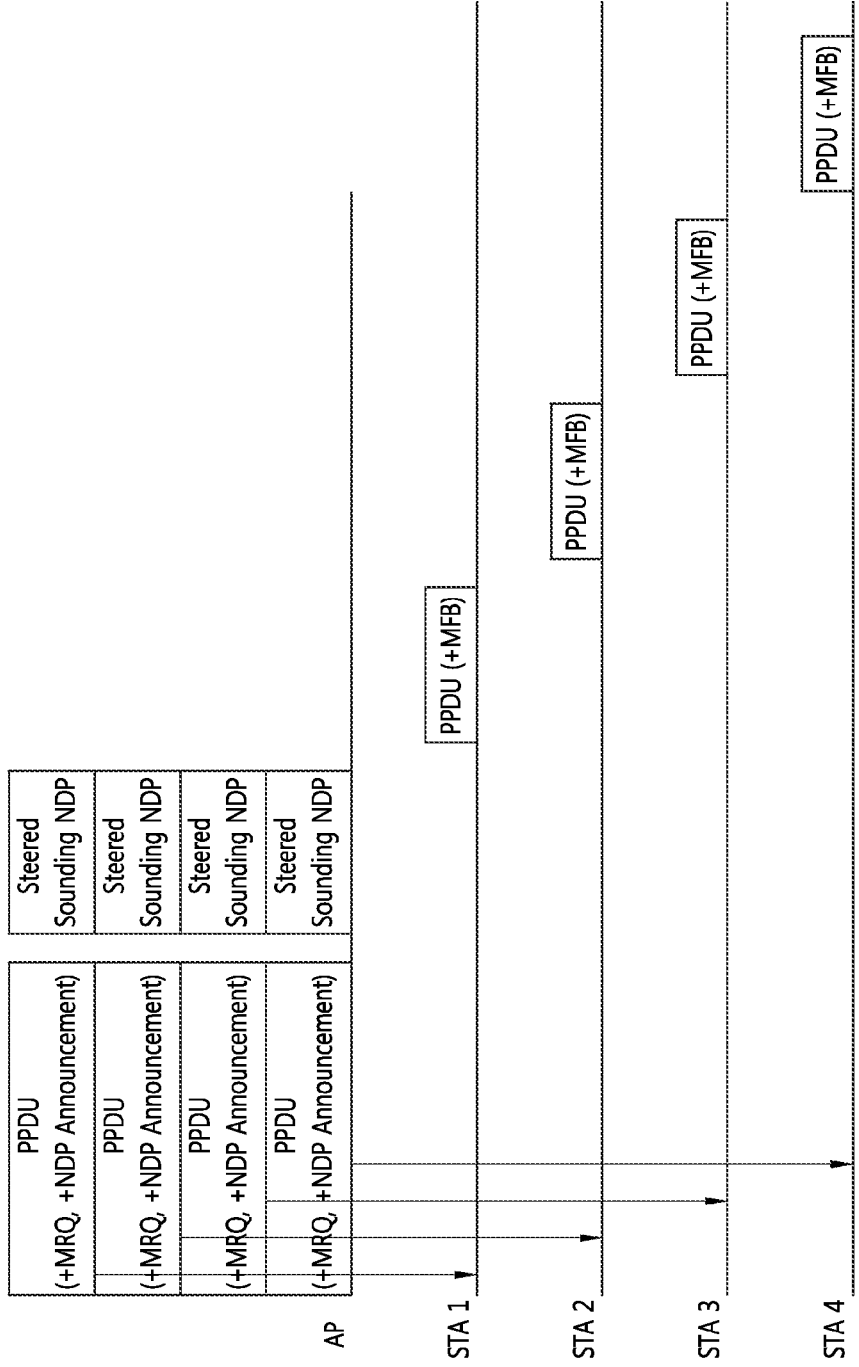
FIG. 5 shows an example of a link adaptation procedure using a Null Data Packet (NDP) which may be applied to MU-MIMO.

FIG. 5 shows an example of a link adaptation procedure using a Null Data Packet (NDP) which may be applied to MU-MIMO.

The NDP means that only a PHY header exists and a PLCP Service Data Unit (PSDU) does not exist. For reference, in MAC data types defined in IEEE 802.11, a null data frame means that only a MAC header exists and a MAC Service Data Unit (MSDU) does not exist. Since the PSDU does not exist in the NDP, the MAC header included in the PSDU also does not exist. Information about the address of a source STA and information about the address of a destination STA are included in the Source Address (SA) field and the Destination Address (DA) field of the MAC header and transmitted. Accordingly, in order to transmit an NDP, it is necessary to transmit an NDP announcement message informing that the NDP will be subsequently transmitted before the NDP is transmitted. The PPDU transmitted by an AP first of all in FIG. 5 shows an example of the transmission of the NDP announcement message. The PPDU may include an MRQ and an NDP announcement message. The NDP announcement message may be transmitted to the target reception STAs of the NDP in such a manner that a new management action frame is defined and the NDP announcement message is transmitted through the newly defined management action frame or an indication bit informing that the NDP will be subsequently transmitted is included in a conventional control frame, management frame, or data frame and the NDP announcement message is transmitted through the conventional control frame, management frame, or data frame.

The address of a source STA and the address of a destination STA for an NDP is indicated by the Source Address (SA) and the Destination Address (DA) of an NDP announcement frame (or a frame including the NDP announcement message). The NDP is a sounding PPDU, and the STA may perform channel estimation on the basis of the NDP.

In the example of FIG. 5, the AP wants to perform DL MU-MIMO transmission to an STA 1, an STA 2, an STA 3, and an STA 4. The AP transmits a frame including an NDP announcement message or the NDP announcement frame and then transmits an NDP. An MRQ may be further included in the frame, including the NDP announcement message, or the NDP announcement frame.

The NDP is transmitted to the STA 1, the STA 2, the STA 3, and the STA 4 at the same time. Here, the NDPs are transmitted as NDPs steered according to precoding vectors set toward the respective reception STAs. Each of the STAs estimates an MCS through the received NDP. Since the AP has transmitted the NDPs to the STA 1, the STA 2, the STA 3, and the STA 4 at the same time, interference occurring owing to spatial streams transmitted to other STAs is incorporated into the estimation of the MCS.

Figure 6:
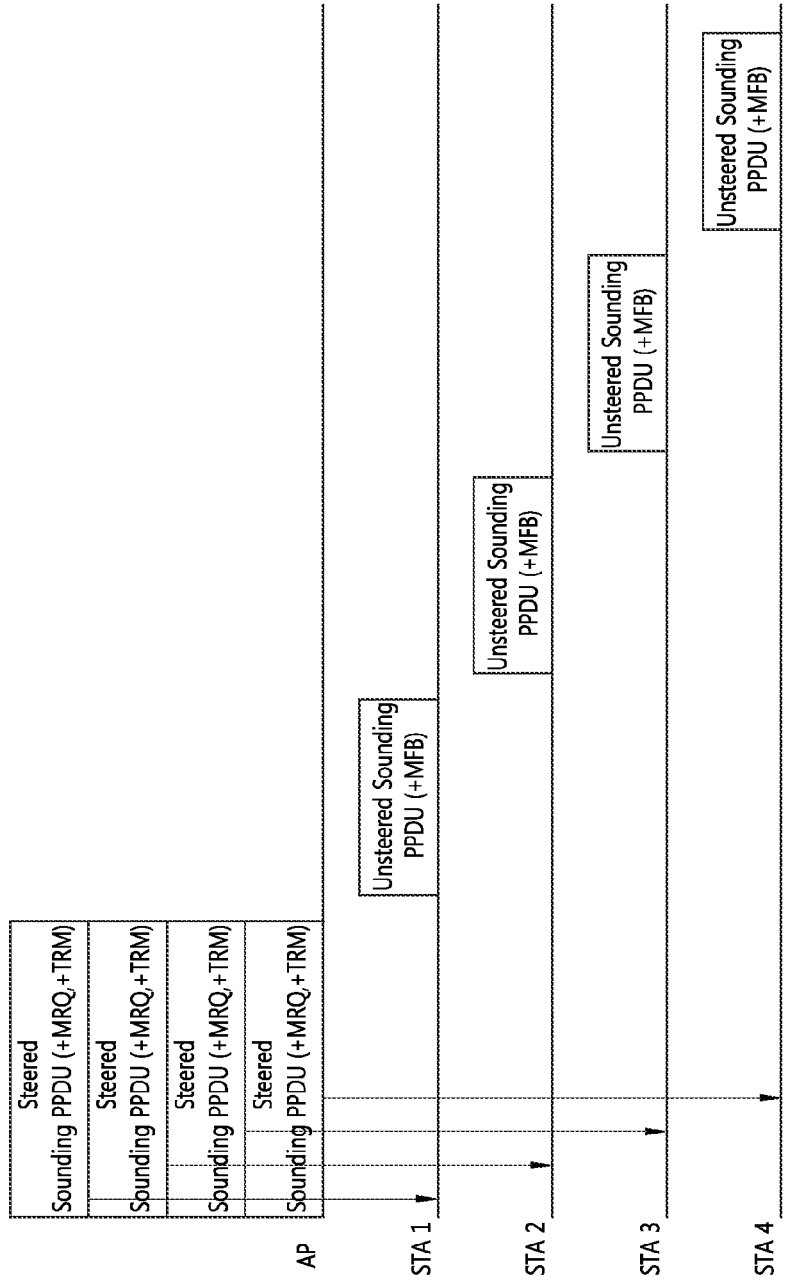
FIG. 6 shows an example in which a channel estimation procedure and a link adaptation procedure applicable to MU-MIMO transmission are performed at the same time.

FIG. 6 shows an example in which a channel estimation procedure and a link adaptation procedure applicable to MU-MIMO transmission are performed at the same time.

For a channel estimation procedure, an AP transmits a training request (TRQ) message (TRM), requesting the transmission of sounding frames, to MU-MIMO-paired STAs. The STAs which have received the TRM transmit sounding PPDUs to the AP so that the AP may perform channel estimation. In the example of FIG. 6, it is assumed that an UL channel and a DL channel are reversible because they have channel characteristics.

If the channel estimation and link adaptation procedures are performed at the same time, the AP transmits the TRM through the sounding PPDU and, at the same time, transmits the MRQ. Here, the sounding PPDU is a steered PPDU toward each of the STAs. The STA which has received the sounding PPDU estimates an MCS and sends an MFB to the AP. In this case, the sounding PPDU transmitted by the STA in response to the TRM requested by the AP may include the MFB. Here, the sounding PPDU transmitted by the STA is for enabling the AP to perform channel estimation and is transmitted as an unsteered PPDU. The AP performs channel estimation through the sounding PPDUs transmitted by the STAs. If there is a change of a channel state between the STA and the AP, the MCS value transmitted by the STA as a response may be corrected by incorporating the change of the channel state into the MCS value. If a channel state is not changed between the STA and the AP, DL MU-MIMO transmission may be performed by using the MCS value transmitted by the STA as a response.

Figure 7:
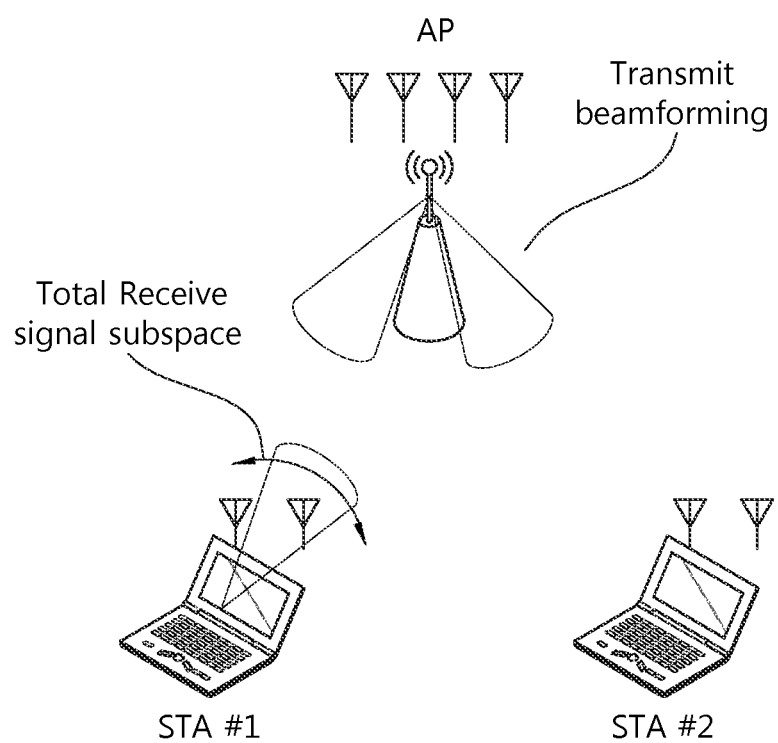
FIG. 7 simply shows transmission and reception using beamforming in MU-MIMO transmission.

FIG. 7 simply shows transmission and reception using beamforming in MU-MIMO transmission.

When an AP performs MU-MIMO transmission to a plurality of STAs through beamforming, a precoding matrix (or a precoding vector) applied for the beamforming is determined using channel information between the STA and the AP. Zero-Forcing Beam-Forming (ZF-BF) or Block Diagonalization Beam-Forming (BD-BF) may be performed as a precoding method for MU-MIMO transmission. When the ZF-BF or the BD-BF is performed, a precoding matrix is determined so that frames transmitted to different STAs do not function as mutual interference.

Figure 8:
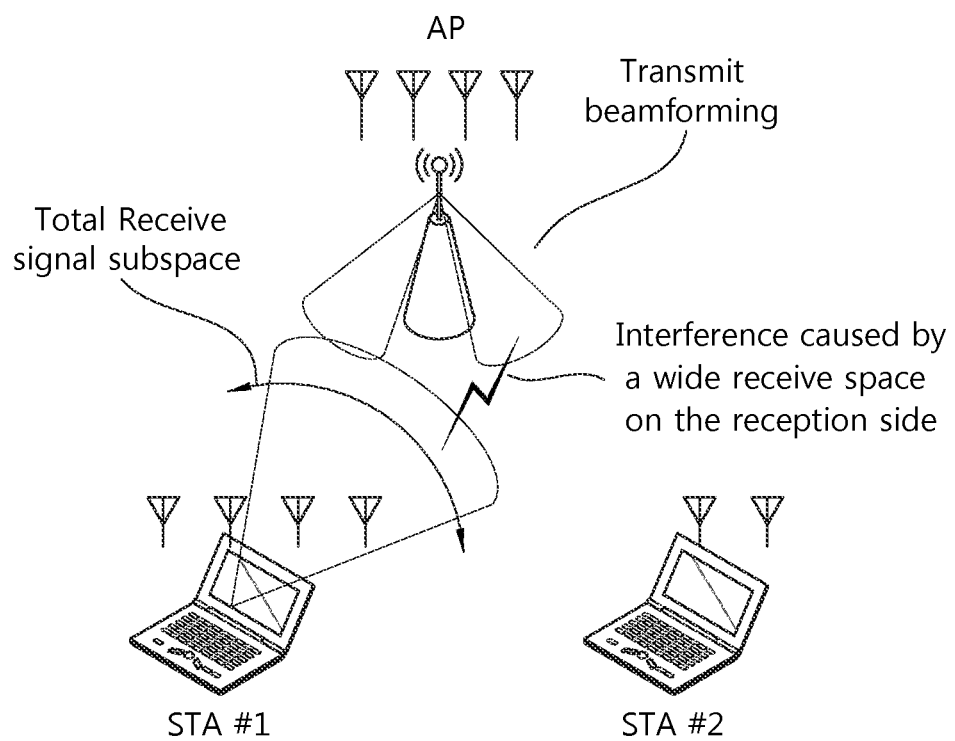
FIG. 8 is a diagram showing an example in which a beamformed signal transmitted to another STA functions as interference in MU-MIMO transmission.

FIG. 8 is a diagram showing an example in which a beamformed signal transmitted to another STA functions as interference in MU-MIMO transmission.

When precoding is applied to signals for different STAs and the signals are then subject to beamforming transmission, a possibility that the signals may function as interference with the different STAs has reciprocity with the number of Rx antennas of each of the STAS. For example, if an STA1 has four receive (Rx) antennas in the state in which an AP performs beamforming transmission through four transmit (Tx) antennas as in the example of FIG. 8, a signal transmitted from the AP to an STA2 may function as interference as the subspace of a signal that may be received by the STA1 is increased. That is, since the STA1 has the four Rx antennas and thus the subspace of a signal that may be received by the STA1 is increased, the STA1 may receive a signal transmitted to the STA2, with the result that the signal transmitted to the STA2 functions as interference with the STA1.

Furthermore, if an STA supports a number of antennas, an AP may be informed of a sounding or channel coefficient in order to inform the AP of channel information between the AP and the STA. However, information that must be transmitted is increased in proportion to the number of antennas. With consideration taken of that the number of STAs paired for MU-MIMO transmission may be various, to inform channel information about spatial streams more than the number of spatial streams to be allocated to each of MU-MIMO-paired STAs may not be preferred from a viewpoint of the efficient use of radio resources. In order to solve this problem, an MU-MIMO transmission procedure capable of reducing interference and a sounding method for beamforming capable of reducing interference are proposed.

A sounding procedure may be first performed in order for an AP to obtain channel information (e.g., a channel coefficient) between a relevant one of STAs that may be the targets of MU-MIMO transmission and the AP from the STAs before the AP performs the MU-MIMO transmission on data. As described above, in order for the AP to obtain the channel information through the sounding procedure, a method of receiving a sounding frame from an STA and obtaining the channel information by performing channel estimation using the received sounding frame and a method of receiving the channel coefficient from an STA in the form of quantized data and obtaining the channel information may be used. In this case, a sounding signal transmitted by the STA may be previously precoded and transmitted. If the sounding signal has been previously precoded when the sounding signal is transmitted, the STA receives the data subjected to the MU-MIMO-transmission through a specific reception beamforming or reception procedure on the basis of the precoding, performed when the sounding signal is transmitted, when subsequently receiving the MU-MIMO-transmission data. Through this process, the STA does not receive data through all Rx antennas without restriction, but uses the Rx antennas within restrictions. Accordingly, functioning as interference by the transmission of data streams from an AP to other STAs through MU-MIMO transmission can be minimized. Here, if the sounding signal is transmitted in the form of a quantized channel coefficient, the precoding of the sounding signal may be performed in such a way as to perform the precoding on the channel coefficient and transmit the precoded channel coefficient in a quantized form.

Figure 9:
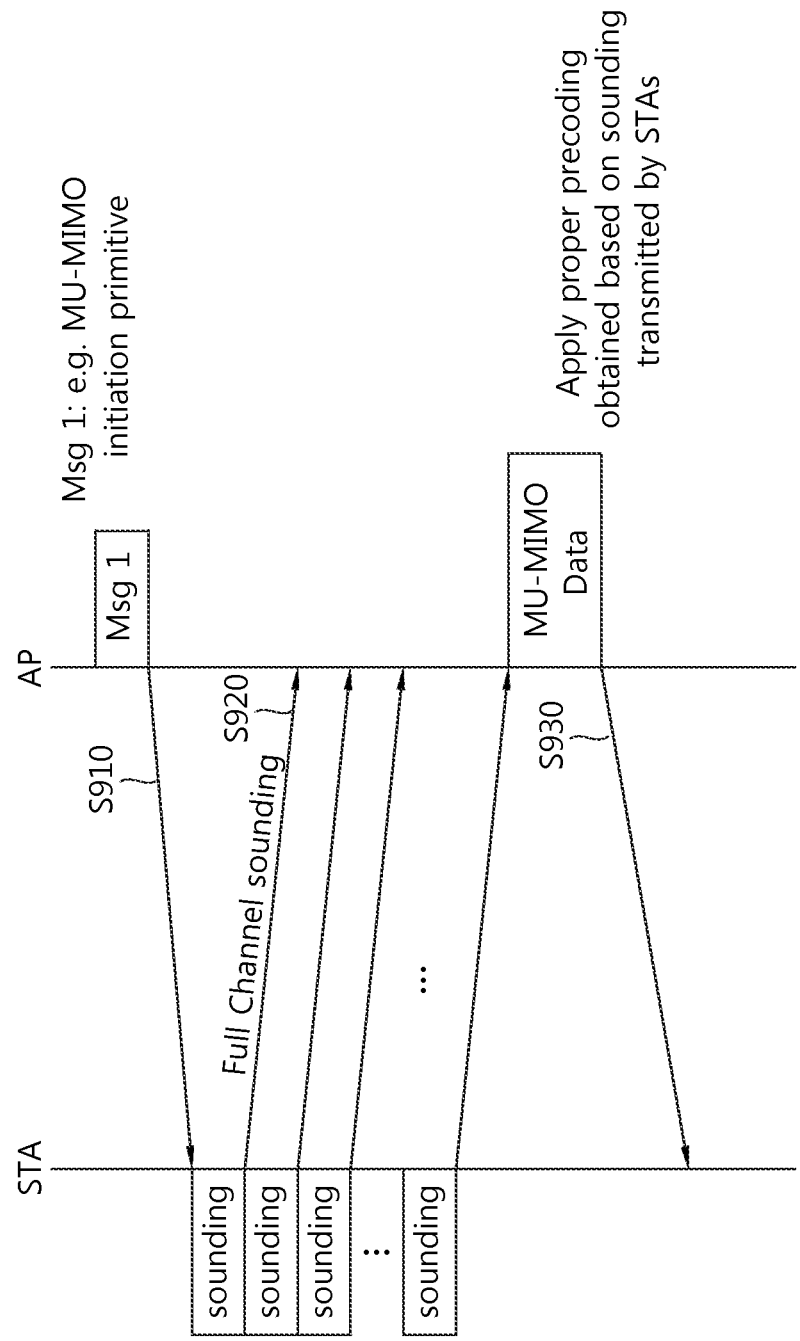
FIG. 9 shows an example of a channel estimation procedure for obtaining channel information in MU-MIMO transmission.

FIG. 9 shows an example of a channel estimation procedure for obtaining channel information in MU-MIMO transmission.

Prior to MU-MIMO transmission, an AP transmits a message Msg 1, informing that MU-MIMO transmission will be initiated, to STAs, that is, the targets of MU-MIMO transmission (S910). An MU-MIMO initiation primitive of FIG. 9 is an example of the message informing that MU-MIMO transmission will be initiated. The Msg 1 is transmitted to the MU-MIMO-paired STAs, and each STA which has received the Msg 1 knows that data will be subject to MU-MIMO transmission to the STA. The Msg 1 may include a message (e.g., a TRM) indicating that a sounding frame will be transmitted so that the AP may obtain channel information between the AP and the MU-MIMO-paired STA.

The STA which has received the Msg 1 may transmit a sounding frame to the AP in order to receive data scheduling (S920). Here, the STA transmits information about all channels so that the AP may know channel coefficients corresponding to physical antennas that may be transmitted and received by the STA. In FIG. 9, as a method in which the STA transmits information about all channels to the AP, a method of transmitting the sounding frame to the AP so that the AP may obtain channel information about full dimensions using the received sounding frame through channel estimation has been described as an example, but this is only an example. The STA may directly transmit the channel information in the form of quantized data. Unless a sounding method is specially limited otherwise, the transmission of a sounding frame for channel sounding from an STA to an AP includes a sounding method in which the AP obtains channel information by performing channel estimation using the sounding frame and a sounding method in which the STA transmits quantized channel information to the AP in the form of data using the sounding frame.

The AP which has obtained the channel information through S920 transmits MU-MIMO data, beamformed by performing precoding based on the obtained channel information, to MU-MIMO-paired STAs (S930).

However, this MU-MIMO transmission method may generate the problem described in the example of FIG. 8. In other words, a problem, such as the waste of radio resources necessary for signaling for channel information depending on the number of MU-MIMO-paired STAs and the number of Rx antennas of each STA, and a problem that data streams transmitted to other STAs may function as interference may be generated.

Figure 10:
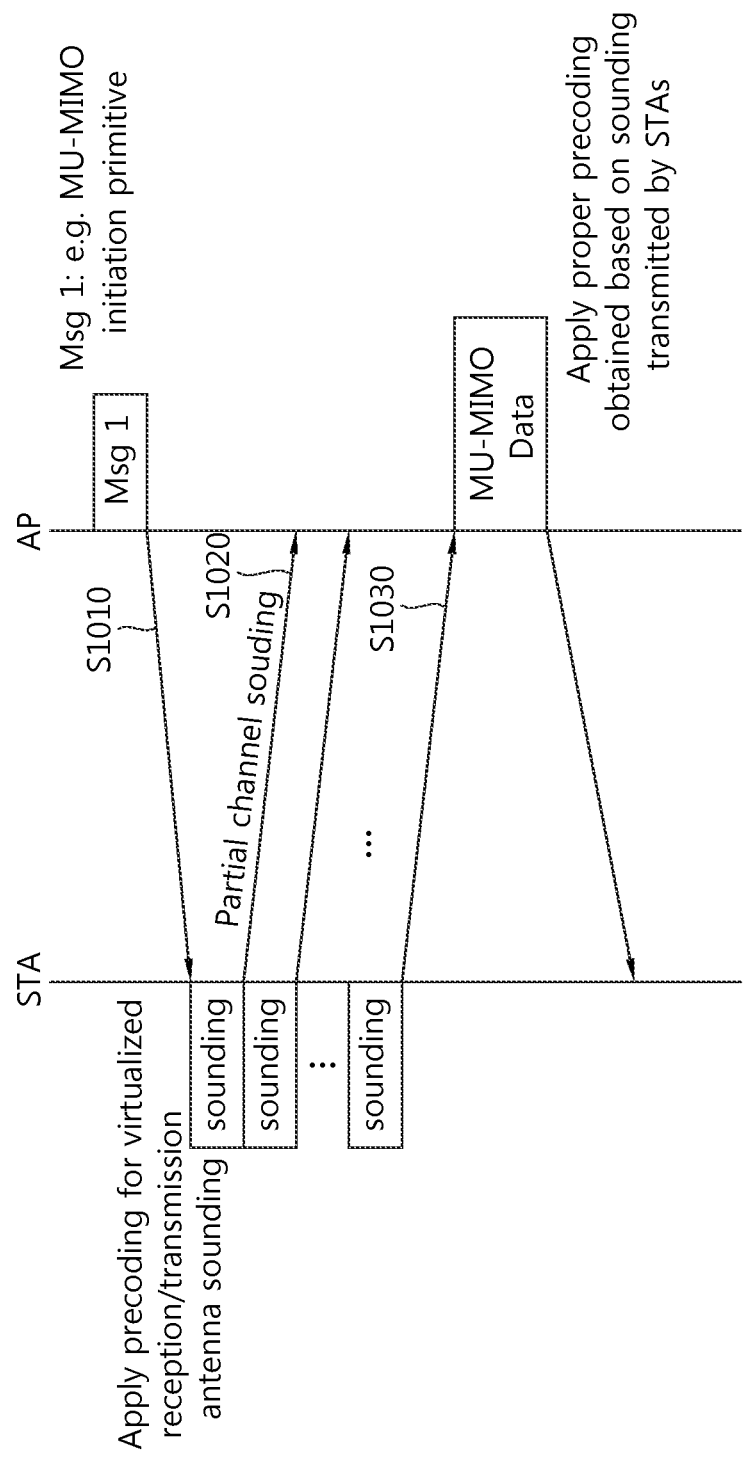
FIG. 10 is a message flowchart illustrating an MU-MIMO transmission method according to an embodiment of the present invention.

FIG. 10 is a message flowchart illustrating an MU-MIMO transmission method according to an embodiment of the present invention.

Like in the example of FIG. 9, prior to MU-MIMO transmission, an AP transmits a message Msg 1 to MU-MIMO-paired STAs (S1010). The Msg 1 is transmitted to the MU-MIMO-paired STAs. Each STA which has received the Msg 1 knows that data will be subsequently subject to MU-MIMO transmission to the STA. The Msg 1 may include a message (e.g., a TRM) indicating that a sounding frame will be transmitted so that the AP may obtain channel information between the AP and the MU-MIMO-paired STA.

The STA which has received the Msg 1 transmits a sounding frame to the AP so that the AP may obtain channel information (S1020). In transmitting the sounding frame, the STA does not sound channels for all Tx/Rx antennas, but sounds some of the channels. Alternatively, the STA virtualizes the Rx antennas using precoding and sounds the virtualized channels. If the STA sounds the virtualized channels, the AP may determine that the STAs have less Rx antennas than actual Rx antennas. Accordingly, the above problem due to the number of Rx antennas of an STA can be solved. This method has an advantage in that interference due to data streams transmitted to other STAs in an environment in which MU-MIMO transmission is performed can be reduced in addition to an advantage in that less channel information can be transmitted.

The sounding to which precoding is applied by the STA may be called that the STA transmits channel information about some dimensions instead of transmitting channel information about full dimensions using precoding (it may be called post-precoding from a viewpoint of the AP) in the sounding process. What the STA transmits the information about the virtualized channels by performing precoding prior to sounding may be otherwise called what the STA transmits effective channel information instead of transmitting channel information about full dimensions.

The AP which has received the sounding frame obtains the channel information (it may also be differently expressed as channel information about effective channels) about the channels virtualized by the STA, performs beamforming based on the channel information of the virtualized channels, and performs MU-MIMO transmission for the MU-MIMO data (S1030).

The STA may transmit the information about virtualization channels having a lower dimension than actual channel information using several methods. In a method in which an STA transmits a signal measured by an AP and estimates channel information by utilizing the reciprocity of an UL channel and a DL channel of a Time Division Duplex (TDD) system, if the STA transmits a signal necessary for the AP to estimate the channel information by multiplying the transmitted signal by a specific matrix (or vector), the AP obtains the information of the virtualized channels. Here, the AP may determine that the STA has the number of Rx antennas smaller than the actual number of Rx antenna and operates.

As a detailed embodiment, if an AP performs MU-MIMO transmission by using BD-BF, each of MU-MIMO-paired STAs transmits a sounding frame to which precoding is applied to the AP when transmitting the sounding frame to the AP. Here, an applicable precoding matrix may be obtained by applying ($H=U\Sigma V^H$) a decomposition scheme, such as Singular Value Decomposition (SVD), to the full channel matrix H between the AP and the STA which transmits the sounding frame.

For example, some column vectors of a matrix U (U is an eigen matrix obtained by performing SVD on the channel matrix H) obtained through the SVD scheme may be applied to the precoding in sounding.

The STA transmits the sounding frame by applying the precoding matrix requested by the AP or adaptively determined based on a channel state. Here, the AP may inform the STA of dimension indication information that may be a criterion for determining the precoding matrix. The dimension indication information indicated by the AP may be included in the Msg 1 and transmitted to the STA or the dimension indication information may be transmitted to the STA through an additional management action frame. The dimension indication information may have a form directly indicating the dimension of a virtualized channel or a form indicating a difference value between the dimension of an actual channel and the dimension of a virtualized channel, when the STA virtualizes a channel by applying precoding to sounding. For another example, the dimension indication information may have a form indicating the number of Rx antennas of an STA, which is seen by an AP as a result of virtualization.

As another method, if the STA quantizes the channel coefficient and transmits the channel coefficient to the AP at step S1020, the STA may use a method of producing a virtual channel coefficient matrix having a smaller dimension by multiplying the estimated channel coefficient matrix by a virtualization matrix and transmitting relevant information to the AP. Here, the virtual channel coefficient matrix transmitted by the STA may become a matrix V which is obtained by performing SVD on all the channels $H=(U\Sigma V^H)$.

In general, in linear MIMO precoding, precoding performed prior to transmission is determined so that a reception STA is not subject to spatial interference to the greatest extent for each different spatial stream when the reception STA receives a signal. Furthermore, each of the matrices U and V obtained by performing SVD on the matrix is a unitary matrix, and it has characteristics, such as Equation 1. Here, I is an identity matrix.

$$VV^H=I,\ V^HV=I,$$

$$UU^H=I,\ U^HU=I \qquad \text{<Equation 1>}$$

If a transmission STA precodes a signal by using the matrix V and a reception STA performs equalization on the signal again by using $U^H$, interference between spatial streams can be minimized. This may be represented by Equation 2 below.

$$Y=HPX+N$$

$$Y=U\Sigma V^H PX+N,\ P=V \qquad \text{<Equation 2>}$$

In Equation 2, X indicates a transmission signal to be transmitted, P indicates a transmission precoding matrix, N indicates a noise signal, and Y indicates a reception signal.

If equalization is performed on a reception signal by using $U^H$, the result, such as that of Equation 3, may be obtained.

$$U^H Y = U^H U \Sigma V^H V X + N$$

$$U^H Y = \Sigma X + N \qquad \text{<Equation 3>}$$

In SVD, the $\Sigma$ matrix is a diagonal matrix and is composed of only simple constant. Thus, if V is used as transmission precoding and a reception STA uses $U^H$ for equalization, a reception STA can obtain a data signal multiplied by a constant value. Accordingly, interference between spatial streams can be minimized.

Prior to MU-MIMO transmission, when an AP transmits the Msg 1 (e.g., an MU-MIMO initiation primitive) informing that the MU-MIMO transmission will be initiated, the Msg 1 may be transmitted in a legacy mode so that a legacy STA may also listen to the Msg1 and so that STAs other than an STA (e.g., a legacy STA supporting IEEE 802.11 a/b/g/n), not supporting the MU-MIMO transmission, and MU-MIMO-paired STA may set a Network Allocation Vector (NAV) and defers channel access. In other words, the Msg 1 is transmitted so that all STAs including the legacy STA within a BSS may also listen to the Msg1, and thus STAs which are not the targets of MU-MIMO transmission which has received the Msg 1 may set the NAVs. Next, the sounding procedure for channel estimation for MU-MIMO is directly initiated.

In general, sounding for the channel estimation of STAs is sounding transmitted without precoding, which enables all channels to be estimated. At this time, the AP may not transmit a sounding frame.

Figure 11:
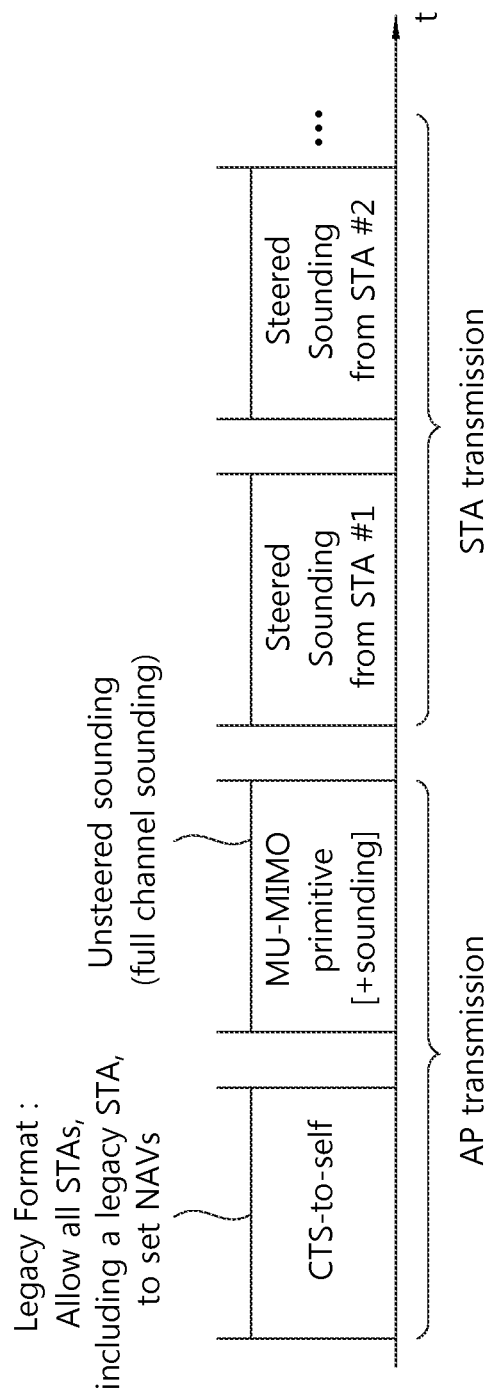
FIG. 11 shows an example of an MU-MIMO transmission procedure proposed by the present invention.

FIG. 11 shows an example of an MU-MIMO transmission procedure proposed by the present invention.

An AP transmits a CTS-to-self frame in a legacy format that may be heard by all STAs within a BSS so that STAs other than MU-MIMO-paired STA which have received the CTS-to-self frame can set NAVs.

After transmitting the CTS-to-self frame, the AP transmits an MU-MIMO primitive informing that MU-MIMO transmission will be initiated. Here, the AP may transmit a signal (e.g., a Long Training Field (LFT)) for channel estimation for sounding a channel between the AP and MU-MIMO-paired STAs, along with the MU-MIMO primitive.

Figure 12:
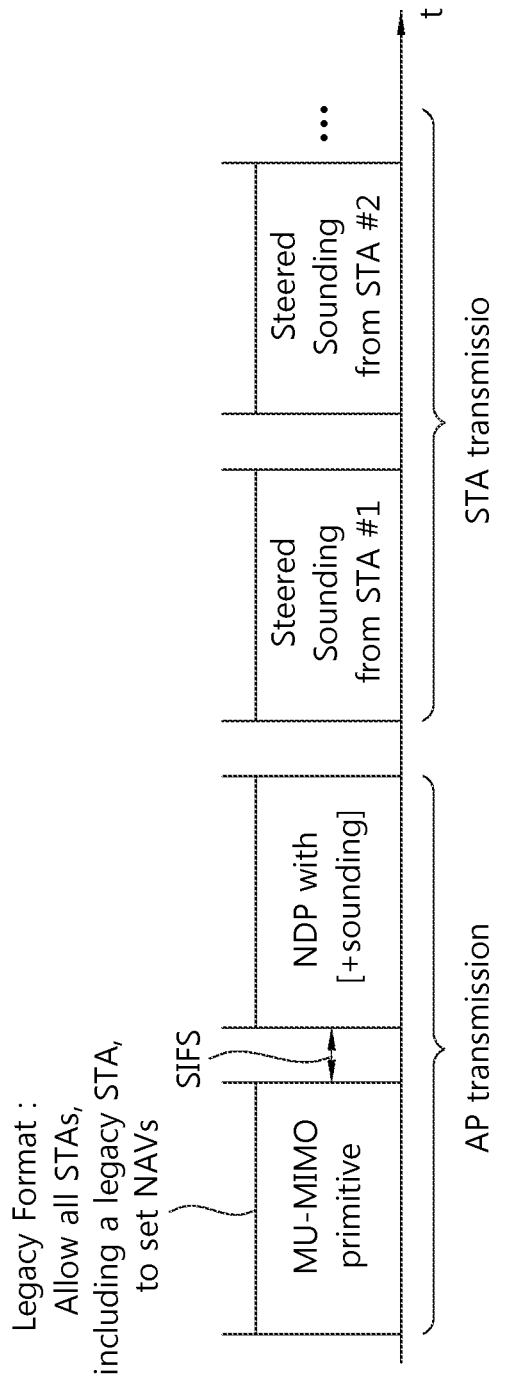
FIG. 12 shows another example of an MU-MIMO transmission procedure proposed by the present invention.

FIG. 12 shows another example of an MU-MIMO transmission procedure proposed by the present invention.

An AP transmits an MU-MIMO primitive in a legacy format so that all STAs can listen to the MU-MIMO primitive. An STA which has received the MU-MIMO primitive, but is not the target of MU-MIMO transmission may defer channel access by setting an NAV. Next, the STA transmits a signal for channel estimation in order to sound a channel between the AP and the STA, along with an NDP frame, after a lapse of a short inter-frame space (SIFS).

Figure 13:
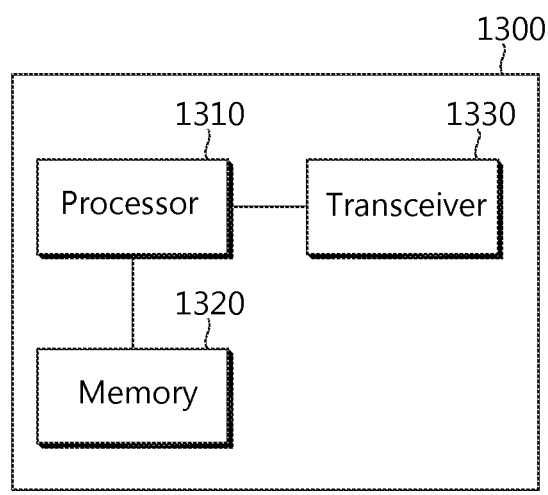
FIG. 13 is a block diagram showing a wireless apparatus in which embodiments of the present invention are implemented.

FIG. 13 is a block diagram showing a wireless apparatus in which the embodiments of the present invention are implemented. The wireless apparatus 1300 may be an AP or an STA.

The wireless apparatus 1300 includes a processor 1310, memory 1320, and a transceiver 1330. The transceiver 1330 transmits/receives a radio signal, and the physical layer of IEEE 802.11 is implemented in the transceiver 130. The processor 1310 is coupled to the transceiver 1330, and it implements the MAC layer of IEEE 802.11. When the processor 1310 processes operations in an AP in the above-described methods, the wireless apparatus 1300 becomes the AP. When the processor 1310 processes operations in an STA in the above-described methods, the wireless apparatus 1300 becomes the STA. The processor 1310 and/or the transceiver 1330 may include Application-Specific Integrated Circuits (ASICs), other chipsets, logic circuits and/or a data processing apparatus. The memory 1320 may include Read-Only Memory (ROM), Random Access Memory (RAM), flash memory, memory cards, storage media and/or other storage devices. When the above-described embodiment is implemented in software, the above-described scheme may be implemented using a module (process or function) that performs the above function. The module may be stored in the memory 1320 and executed by the processor 1310. The memory 1320 may be placed inside or outside the processor 1310 and connected to the processor 1310 using a variety of well-known means.

The above-described embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

The invention claimed is:

1. A Multi-User-Multiple Input Multiple Output (MU-MIMO) transmission method performed by an Access Point (AP) in a Wireless Local Area Network (WLAN) system, the method comprising:
    transmitting an MU-MIMO initiation message to a destination station (STA) that is a target of a MU-MIMO transmission, the MU-MIMO initiation message including dimension indication information and informing that MU-MIMO transmission will be initiated;
    receiving a sounding frame as a response to the MU-MIMO initiation message; and
    performing MU-MIMO transmission on data by beamforming based on channel information obtained from the received sounding frame,
    wherein the sounding frame comprises precoded and virtualized channel information ($H_{virtual}$) between the AP and the destination STA, wherein a dimension of the $H_{virtual}$ is determined based on the dimension indication information and is lower than a dimension of channel information (H) between the AP and the STA, and wherein the dimension indication information includes at least information indicating a difference between the dimension of the H and the dimension of the $H_{virtual}$, information indicating the dimension of the $H_{virtual}$ or information indicating a number of virtualized receive (Rx) antennas of the destination STA.

2. The method of claim 1, further comprising obtaining the $H_{virtual}$ from the sounding frame by performing channel estimation based on the sounding frame.

3. The method of claim 1, wherein a channel coefficient of quantized $H_{virtual}$ is transmitted in the sounding frame and further comprising obtaining the $H_{virtual}$ from the sounding frame by processing the quantized $H_{virtual}$.

4. The method of claim 1, wherein precoding is applied to the sounding frame by applying an eigen matrix as a precoding matrix, the eigen matrix obtained by performing Singular Value Decomposition (SVD) on the H.

5. The method of claim 1, wherein precoding is applied to the sounding frame by applying a matrix as a precoding matrix, the matrix consisting of some or row vectors or $U^H$, the $U^H$ obtained by Singular Value Decomposition (SVD) on the H.

6. A channel sounding method performed by a station (STA) in a Wireless Local Area Network (WLAN) system supporting Multi-User-Multiple Input Multiple Output (MU-MIMO), the method comprising:

receiving an MU-MIMO initiation message, the MU-MIMO initiation message including dimension indication information and informing that MU-MIMO transmission will be initiated; and transmitting a sounding frame as a response to the received MU-MIMO initiation message, wherein the sounding frame comprises precoded and virtualized channel information ($H_{virtual}$) between an Access Point (AP) and the STA, wherein a dimension of the $H_{virtual}$ is determined based on the dimension indication information and is lower than a dimension of channel information (H) between the AP and the STA, and wherein the dimension indication information includes at information indicating a difference between the dimension of the H and the dimension of the $H_{virtual}$, information indicating the dimension of the $H_{virtual}$ or information indicating a number of virtualized receive (Rx) antennas of the STA.

7. The method of claim 6, wherein precoding is applied to the sounding frame by applying an eigen matrix as a precoding matrix, the eigen matrix being-obtained by Singular Value Decomposition (SVD) on the H.

8. A station (STA), comprising:
a transceiver configured to transmit and receive frames; and
a processor coupled to the transceiver and configured to control the transceiver to:
receive a Multi-User-Multiple Input Multiple Output (MU-MIMO) initiation message, the MU-MIMO initiation message including dimension indication information and informing that MU-MIMO transmission will be initiated; and
transmit a sounding frame to an Access Point (AP) as a response to the received MU-MIMO initiation message, the sounding frame comprising precoded and virtualized channel information ($H_{virtual}$) between the AP and the STA,
wherein a dimension of the $H_{virtual}$ is determined based on the dimension indication information and is lower than a dimension of channel information (H) between the AP and the STA, and
wherein the dimension indication information includes at information indicating a difference between the dimension of the H and the dimension of the $H_{virtual}$, information indicating the dimension of the $H_{virtual}$ or information indicating a number of virtualized receive (Rx) antennas of the STA.

* * * * *